UNITED STATES PATENT OFFICE.

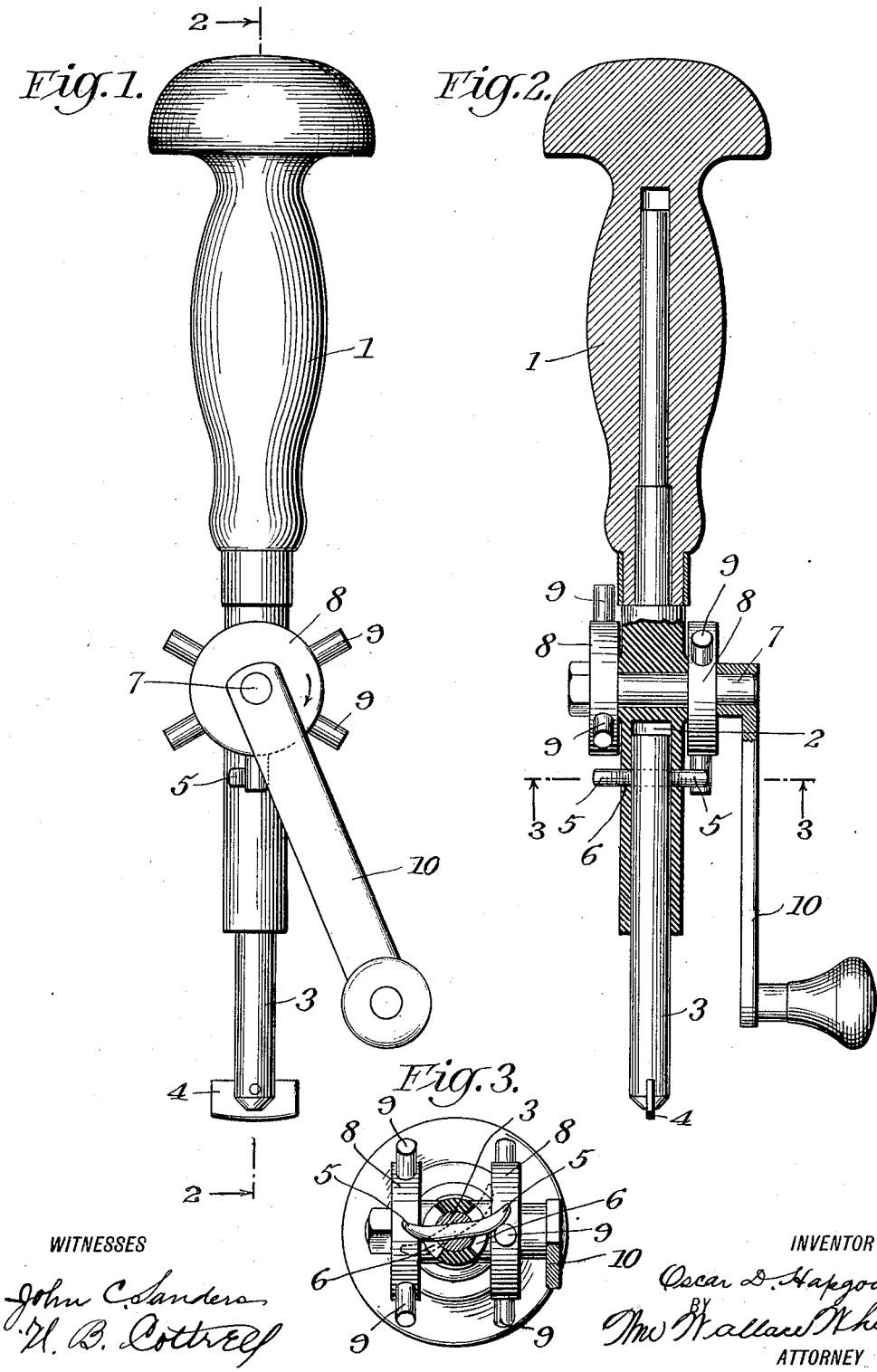

OSCAR D. HAPGOOD, OF ORANGE, MASSACHUSETTS, ASSIGNOR TO GOODELL-PRATT COMPANY, OF GREENFIELD, MASSACHUSETTS, A CORPORATION OF MASSACHUSETTS.

VALVE-GRINDER.

1,102,581.  Specification of Letters Patent.  Patented July 7, 1914.

Application filed April 7, 1914. Serial No. 830,122.

*To all whom it may concern:*

Be it known that I, OSCAR D. HAPGOOD, a citizen of the United States, residing at Orange, Massachusetts, have invented new and useful Improvements in Valve-Grinders, of which the following is a specification.

This invention relates to an improvement in valve grinders.

The objects of the invention are to provide a device of this character which will be simple in construction and operation, and which will be comparatively cheap to manufacture.

Other objects will in part be obvious and in part be pointed out hereinafter.

In the accompanying drawings showing an illustrative embodiment of the invention, in which the same reference numerals refer to similar parts of the several figures, Figure 1 is a side elevational view of the valve grinder; Fig. 2 is a sectional view taken on the line 2—2 of Fig. 1; Fig. 3 is a sectional view taken on the line 3—3 of Fig. 2.

Referring to the drawings, 1 represents the handle of the valve grinder which is provided at its lower end with a socket 2 in which a spindle 3 is oscillatingly mounted, which spindle carries at its lower extremity a valve engaging member 4 of any suitable construction. The spindle 3 is provided with lateral projections 5 which extend through oppositely disposed slots 6 formed in the wall of the socket 2 intermediate its ends. In the embodiment shown in the drawings the projections 6 are the ends of a pin extending through the spindle 3, but it will of course be understood that any other form of projection may be used, as for example, a two toothed gear mounted upon the spindle 3, without departing from the spirit of the invention. The extreme ends of the projections 6 are preferably beveled or curved slightly, as indicated in Fig. 3, for a purpose hereinafter described.

Rotatably mounted in the handle 1 is a transverse shaft 7 to which there is secured at each side of the handle a disk 8. Carried by the disks 8 are radially extending pins or lugs 9, the pins or lugs on each disk being arranged in staggered relation to the pins or lugs on the other disk. A handle 10 is secured to the shaft 7 by means of which it may be rotated. The projections 6 and the pins or lugs 9 are so proportioned and positioned that as the shaft 7 is rotated the projections 9 on the disks 8 will alternately engage the oppositely extending projections 6, thereby causing an oscillating movement of the spindle 3. This will be readily understood from the above description and from an inspection of Fig. 3 of the drawings, in which one of the lugs 9 is shown in full lines in engagement with one of the projections 6, and as the shaft 7 is rotated the projections 6 will be moved into the position indicated by dotted lines, the beveled or curved outer end of the pin permitting the lug 9 to move out of engagement therewith. Upon continued rotation of the shaft one of the lugs 9 on the other of the disks 8 will engage the opposite projections 6, thus rotating the spindle 3 in the opposite direction, and this operation will be repeated as the lugs 9 on the disks 8 alternately engage the projections 6.

In use the valve engaging member 4 is placed in engagement with the valve which rests upon its seat, and the shaft 7 is then rotated by means of the handle 10, the instrument being held in position by means of the handle 1. As the shaft 7 rotates the spindle 3 will be oscillated, as above described, thus producing an oscillating movement of the valve upon its seat, whereby the valve and its valve seat will be ground.

Having described this invention, in connection with the illustrative embodiment thereof, to the details of which disclosure the invention is not of course to be limited, what is claimed as new and what is desired to be secured by Letters Patent is set forth in the appended claim.

I claim—

In a valve grinder, in combination, a handle provided with a socket in its lower end, said socket being provided with oppositely disposed slots extending through its wall, a spindle oscillatingly mounted in said socket and provided with oppositely disposed lateral projections extending through said slots, a valve engaging member carried by said spindle, a rotatable shaft extending through said handle transversely with respect to said spindle, disks secured to said shaft and positioned outside the said handle and on opposite sides thereof and radially extending lugs carried by said disk and adapted to engage said projections as said shaft is rotated, the lugs carried by one of said disks being in staggered relation to the lugs carried by the other of said disks.

In testimony whereof I have signed my name to this specification in the presence of two subscribing witnesses.

OSCAR D. HAPGOOD.

Witnesses:
C. D. SEVERANCE,
G. A. BLAKE.

Copies of this patent may be obtained for five cents each, by addressing the "Commissioner of Patents, Washington, D. C."